(12) United States Patent
Kawakabe et al.

(10) Patent No.: US 6,649,728 B2
(45) Date of Patent: Nov. 18, 2003

(54) CATALYST FOR CURING EPOXY RESINS, METHOD FOR MAKING THE SAME, EPOXY RESIN COMPOSITION, AND POWDER COATING COMPOSITION

(75) Inventors: Hiroshi Kawakabe, Tokyo (JP); Masashi Sugiya, Tokyo (JP); Yoshifusa Hara, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 0 days.

(21) Appl. No.: 10/188,331

(22) Filed: Jul. 3, 2002

(65) Prior Publication Data
US 2003/0109378 A1 Jun. 12, 2003

(30) Foreign Application Priority Data

Jul. 5, 2001 (JP) ........................................ 2001-205254
Jun. 21, 2002 (JP) ........................................ 2002-181117

(51) Int. Cl.$^7$ .............................................. C08G 59/72
(52) U.S. Cl. ........................ 528/89; 502/155; 502/164; 525/438; 525/533; 528/89; 528/91
(58) Field of Search ................................ 502/155, 164; 525/438, 533; 528/89, 91

(56) References Cited

U.S. PATENT DOCUMENTS 4,946,817 A * 8/1990 Bertram ...................... 502/154

* cited by examiner

*Primary Examiner*—Robert Dawson
*Assistant Examiner*—D. Aylward
(74) *Attorney, Agent, or Firm*—Armstrong, Westerman & Hattori, LLP

(57) ABSTRACT

A catalyst for curing epoxy resins comprises a tetraalkylphosphonium tetrafluoroborate represented by Formula (1):

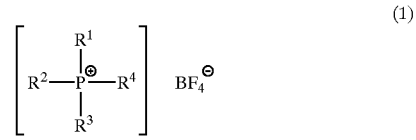

(1)

wherein $R^1$, $R^2$, $R^3$, and $R^4$ are each C1–C5 linear or branched alkyl and may be the same or different, and the halogen ion content in the tetraalkylphosphonium tetrafluoroborate is 20 ppm or less. An epoxy resin powder coating composition containing this catalyst exhibits a prolonged pot life and can be baked at decreased temperatures.

6 Claims, No Drawings

CATALYST FOR CURING EPOXY RESINS, METHOD FOR MAKING THE SAME, EPOXY RESIN COMPOSITION, AND POWDER COATING COMPOSITION

BACKGROUND OF THE INVENTION

1. Field of the Invention

The present invention relates to catalysts for curing epoxy resins and particularly a phosphonium salt catalyst for curing epoxy resins. This catalyst can dramatically improve storage stability, i.e., pot lime, of epoxy resin powder coating compositions. The present invention also relates to a method for making the catalyst, an epoxy resin composition containing the catalyst, and a powder coating composition containing the epoxy resin composition.

2. Description of the Related Art

Thermosetting epoxy resins are extensively used as coating materials in civil engineering, electric, and vehicle fields because of their excellent properties.

The epoxy resins are compounded with a hardener and a curing catalyst and are cured in use. Recently, the epoxy resins have attracted attention in the form of environmentally harmonious powder coatings containing no organic solvents. In particular, a powder coating that has carboxyl groups as primary end groups and is composed of a polyester resin and an epoxy resin has a satisfactory appearance and is relatively inexpensive; hence, this powder coating is extensively used in a variety of industrial fields, such as household electric appliances and building materials. Such types of powder coating require a baking process at high temperatures for a long time. In order to reduce energy costs, hardening catalysts are added to allow low-temperature baking to be carried out.

Examples of hardening catalysts that have been used for such types of powder coating include triphenylphosphine, imidazoline, and imidazole. Powder coatings containing any of these hardening catalysts, however, have poor pot life and exhibit an increase in viscosity during blending and poor fluidity in a molding process.

Countermeasures for solving such problems are, for example, use of a metal salt complex of an adduct of polyepoxide and an imidazole compound as disclosed in Japanese Unexamined Patent Application Publication No. 10-30015 and use of an imidazole derivative having a melting point of 170° C. or more as disclosed in Japanese Unexamined Patent Application Publication No. 10-204329.

Phosphonium salts such as phosphonium borates have been known as excellent curing catalysts for epoxy resins. Tetraalkylphosphonium tetrafluoroborate has high solubility in organic solvents, a high degree of dissociation, and high electrochemical stability and is used as an electrolyte for electric double-layer capacitors.

Tetraalkylphosphonium tetrafluoroborate is commercially produced using tetraalkylphosphonium bromide (Formula (3) and sodium borofluoride (Formula (4) according to Reaction Formula (I):

Reaction Formula (I)

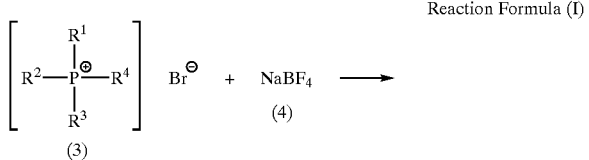

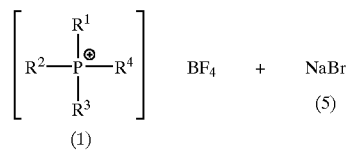

In this reaction, sodium bromide (Formula (5)), in addition to the target product, is formed as a byproduct.

Even if the resulting tetraalkylphosphonium tetrafluoroborate or a known phosphonium salt is used as a curing catalyst for epoxy resin powder coatings, the pot life of the epoxy resin powder coatings is not improved.

SUMMARY OF THE INVENTION

An object of the present invention is to provide a catalyst for curing epoxy resins that can dramatically improve the pot life of an epoxy resin powder coating composition.

Another object of the present invention is to provide an epoxy resin composition and a powder coating composition containing the catalyst and exhibiting improved pot life.

The inventors of the present invention have intensively studied phosphonium salt curing catalysts that can preferably be used in epoxy resin powder coatings and have discovered that a tetraalkylphosphonium tetrafluoroborate curing catalyst having a specific structure that is produced by the reaction of a tetraalkylphosphonium hydroxide with fluoroboric acid and has a drastically reduced amount of halogen ion content dramatically improves the pot life of the epoxy resin and the epoxy resin powder coating. The present invention has been thereby completed.

According to a first aspect of the present invention, a catalyst for curing epoxy resins comprises a tetraalkylphosphonium tetrafluoroborate represented by Formula (1):

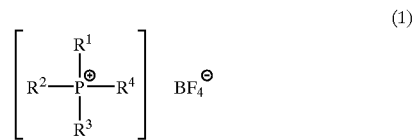

wherein $R^1$, $R^2$, $R^3$, and $R^4$ are each C1–C5 linear or branched alkyl and may be the same or different, and the halogen ion content in the tetraalkylphosphonium tetrafluoroborate is 20 ppm or less.

According to a second aspect of the present invention, a method for making the catalyst according to the first aspect includes allowing a tetraalkylphosphonium hydroxide represented by Formula (2) to react with fluoroboric acid:

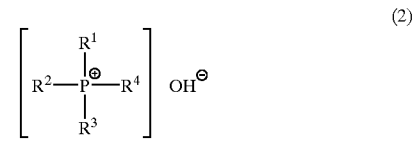

wherein $R^1$, $R^2$, $R^3$, and $R^4$ are defined in the first aspect.

According to a third aspect of the present invention, an epoxy resin composition comprises an epoxy resin, a hardener, and the catalyst according to the first aspect.

According to a fourth aspect of the present invention, a powder coating composition comprises the epoxy resin composition according to the third aspect.

DESCRIPTION OF THE PREFERRED EMBODIMENTS

The present invention will now be described in detail.

The catalyst for curing epoxy resins according to the present invention is a tetraalkylphosphonium tetrafluoroborate represented by Formula (1):

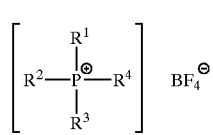

(1)

wherein $R^1$, $R^2$, $R^3$, and $R^4$ are each C1–C5 linear or branched alkyl. Examples of alkyls include methyl, ethyl, propyl, butyl, and pentyl. $R^1$, $R^2$, $R^3$, and $R^4$ may be the same or different.

Examples of tetraalkylphosphonium tetrafluoroborates include tetramethylphosphonium tetrafluoroborate, tetraethylphosphonium tetrafluoroborate, tetra-n-propylphosphonium tetrafluoroborate, tetra-iso-propylphosphonium tetrafluoroborate, tetra-n-butylphosphonium tetrafluoroborate, tetra-iso-butylphosphonium tetrafluoroborate, tetra-sec-butylphosphonium tetrafluoroborate, tetra-tert-butylphosphonium tetrafluoroborate, tetra-n-pentylphosphonium tetrafluoroborate, tetra-iso-pentylphosphonium tetrafluoroborate, tetra-tert-pentylphosphonium tetrafluoroborate, tetraneopentylphosphonium tetrafluoroborate, trimethylethylphosphonium tetrafluoroborate, trimethyl-n-propylphosphonium tetrafluoroborate, trimethyl-iso-propylphosphonium tetrafluoroborate, trimethyl-n-butylphosphonium tetrafluoroborate, trimethyl-iso-butylphosphonium tetrafluoroborate, trimethyl-tert-butylphosphonium tetrafluoroborate, trimethyl-sec-butylphosphonium tetrafluoroborate, trimethyl-n-pentylphosphonium tetrafluoroborate, trimethyl-tert-pentylphosphonium tetrafluoroborate, trimethylneopentylphosphonium tetrafluoroborate, triethylmethylphosphonium tetrafluoroborate, triethyl-n-propylphosphonium tetrafluoroborate, triethyl-iso-propylphosphonium tetrafluoroborate, triethyl-n-butylphosphonium tetrafluoroborate, triethyl-iso-butylphosphonium tetrafluoroborate, triethyl-tert-butylphosphonium tetrafluoroborate, triethyl-sec-butylphosphonium tetrafluoroborate, triethyl-n-pentylphosphonium tetrafluoroborate, triethyl-tert-pentylphosphonium tetrafluoroborate, triethylneopentylphosphonium tetrafluoroborate, tri-n-butyl-methylphosphonium tetrafluoroborate, tri-n-butyl-n-propylphosphonium tetrafluoroborate, tri-n-butyl-iso-propylphosphonium tetrafluoroborate, tri-n-butyl-iso-butylphosphonium tetrafluoroborate, tri-n-butyl-tert-butylphosphonium tetrafluoroborate, tri-n-butyl-sec-butylphosphonium tetrafluoroborate, tri-n-butyl-n-pentylphosphonium tetrafluoroborate, tri-n-butyl-tert-pentylphosphonium tetrafluoroborate, tri-n-butylneopentylphosphonium tetrafluoroborate, tri-n-pentylmethylphosphonium tetrafluoroborate, tri-n-pentylethylphosphonium tetrafluoroborate, and tri-n-pentyl-n-butylphosphonium tetrafluoroborate. These may be used alone or in combination.

In the catalyst for curing epoxy resins according to the present invention, the halogen ion content in the tetraalkylphosphonium tetrafluoroborate is 20 ppm or less and preferably 10 ppm or less. The pot life of the epoxy resin composition is improved at such a halogen ion content.

The phosphonium salt represented by Formula (1) and substantially not containing halogen ions can be readily formed by the reaction of a tetraalkylphosphonium hydroxide (Formula (2)) with tetrafluoroboric acid (Formula (6) in an aqueous solvent, as represented by Reaction Formula (2):

Reaction Formula (2)

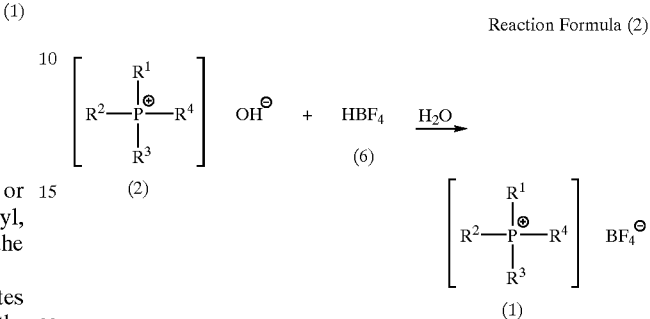

wherein $R^1$, $R^2$, $R^3$, and $R^4$ are defined as above.

The raw material tetraalkylphosphonium hydroxide (Formula (2)) is generally used as an aqueous 2 to 50 weight percent solution and preferably as an aqueous 5 to 15 weight percent solution. The halogen ion content in the aqueous solution is preferably 10 ppm or less and more preferably 5 ppm or less to reduce the halogen ion content in the final product.

An aqueous tetraalkylphosphonium hydroxide solution having a halogen ion content of 10 ppm or less may be prepared by, for example, electrolytic dialysis. For example, Japanese Unexamined Patent Application Publication No. 2-96584 discloses a method for preparing the tetraalkylphosphonium hydroxide represented by Formula (2) using a four-vessel electrolytic bath that is partitioned with two cation exchange membranes and one anion exchange membrane disposed between the cation exchange membranes. An aqueous phosphonium salt solution represented by Formula (7):

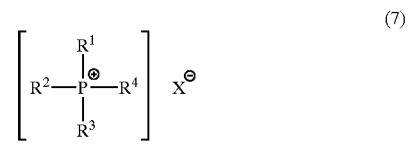

(7)

wherein $R^1$, $R^2$, $R^3$, and $R^4$ are defined as above is DC-electrolyzed in the electrolytic bath to produce the tetraalkylphosphonium hydroxide represented by Formula (2) at the cathode chamber.

The reaction of the tetraalkylphosphonium hydroxide (Formula (2)) with fluoroboric acid (Formula (3)) may be performed in any aqueous solvent, i.e. water, a water-acetone mixed solvent, and a water-alcohol mixture.

The molar ratio of fluoroboric acid to the tetraalkylphosphonium hydroxide (Formula (3)) is preferably in the range of 0.1 to 5 and more preferably 0.5 to 1.5.

The reaction temperature is generally in the range of 0° C. to 100° C. and preferably in the range of 5° C. to 30° C. This neutralization reaction rapidly proceeds and is completed within a time of 0.5 hours or more.

The reaction product is filtered out and dried to recover the final product.

The resulting phosphonium salt (Formula (1)) has a halogen ion content of 20 ppm or less and preferably 10 ppm or less and is suitably used as a catalyst for curing epoxy resin powder coating compositions containing epoxy resins and hardeners.

In the present invention, any epoxy resin having at least two epoxy groups per molecule may be used without limitation. Examples of such epoxy resins include reaction products of novolac phenolic resins and epichlorohydrin; reaction products of bisphenol epoxy resins (type A, type B, type F etc.) and epichlorohydrin; reaction products of novolac phenolic resins, bisphenol epoxy resins (type A, type B, type F etc.) and epichlorohydrin; reaction products of novolac phenolic resins and bisphenol epoxy resins (type A, type B, type F etc.); reaction products of cresol compounds, i.e. cresol novolac, and epichlorohydrin; glycidyl ethers prepared by the reaction of diols, i.e. ethylene glycol, propylene glycol, 1,4-butanediol, polyethylene glycol, polypropylene glycol, neopentyl glycol, and glycerol, with epichlorohydrin; glycidyl esters prepared by the reaction of carboxylic acids, i.e. succinic acid, adipic acid, sebacic acid, phthalic acid, terephthalic acid, hexahydrophthalic acid, and trimellitic acid, with epichlorohydrin; reaction products of hydroxycarboxylic acids, i.e. p-oxybenzoic acid and β-oxynaphthoic acid, with epichlorohydrin; alicyclic epoxy compounds, i.e. 3,4-epoxy-6-methylcyclohexylmethyl-3,4-epoxy-6-methylcyclohexanecarboxylate and 3,4-epoxycyclomethyl (3,4-epoxycyclohexane)carboxylate; and triglycidyl isocyanurate (TGIC) and derivatives thereof. These epoxy resins may be used alone or in combination.

The epoxy resin preferably has an epoxy equivalent in the range of 150 to 1,200 and more preferably 250 to 1,000. Any known hardener that can react with the epoxy resin to form crosslinks may be used in the present invention without limitation. Examples of hardeners preferably used in the present invention include aliphatic amines and alicyclic amines, i.e. bis(4-aminocyclohexyl)methane, bis(aminomethyl)cyclohexane, m-xylenediamine, and 3,9-bis(3-aminopropyl)-2,4,8,10-tetraspiro[5,5]undecane; aromatic amines, i.e. metaphenylene diamine, diaminodiphenylmethane, and diaminodiphenyl sulfone; tertiary amines and corresponding salts, i.e. benzyldimethylamine, 2,4,6-tris(dimethylaminomethyl) phenol, 1,8-diazabicyclo(5,4,0)undecene-7,1,5-diazabicyclo(4,3,0)nonene-7; aromatic acid anhydrides, i.e. phthalic anhydride, trimellitic anhydride, and pyromellitic anhydride; alicyclic carboxylic anhydrides, i.e. tetrahydrophthalic anhydride, methyltetrahydrophthalic anhydride, hexahydrophthalic anhydride, methylhexahydrophthalic anhydride, methylendomethylenetetrahydrophthalic anhydride, dodecenylsuccinic anhydride, and trialkyltetrahydrophthalic anhydrides; polyvalent phenols i.e. catechol, resorcinol, hydroquinone, bisphenol F, bisphenol A, bisphenol S, biphenol, phenol novolac compounds, cresol novolac compounds, novolac compounds of divalent phenols such as bisphenol A, trishydroxyphenylmethane, aralkylpolyphenols, and dicyclopentadiene polyphenols; imidazoles and salts thereof, i.e. 2-methylimidazole, 2-ethyl-4-methylimidazole, and 2-phenylimidazole; $BF_3$ complexes of amine; Bronsted acids, i.e. aliphatic sulfonium salts and aromatic sulfonium salts; dicyandiamide; organic acid hydrazides, i.e. adipic acid dihydrazide and phthalic acid dihydrazide; resols; polycarboxylic acids, i.e. adipic acid, sebacic acid, terephthalic acid, trimellitic acid, and polyester resins containing carboxylic groups; and organic phosphines, i.e. triphenylphosphine. These hardeners may be used alone or in combination. When these hardeners are used in powder coating compositions, polyester resins containing carboxyl groups are preferably used because the polyester resins form hybrid powder coatings containing epoxy resin bases that exhibit excellent compatibility between reactivity, adhesiveness, corrosion resistance, and physical properties and form a variety of coatings.

The polyester resin containing carboxyl groups is generally produced with a polyvalent carboxylic acid and a polyol.

Examples of polyvalent carboxylic acids include succinic acid, adipic acid, sebacic acid, azelaic acid, terephthalic acid, isophthalic acid, hexahydroterephthalic acid, hexahydroisophthalic acid, 2,6-naphthalenedicarboxylic acid, 2,7-naphthalenedicarboxylic acid, dodecanedicarboxylic acid, and 1,4-cyclohexanedicarboxylic acid; corresponding esters and acid anhydrides; lactones, such as γ-butyrolactone and ε-caprolactone, and corresponding hydroxycarboxylic acids; and aromatic oxymonocarboxylic acids, such as p-oxyethoxybenzoic acid.

Examples of polyols includes ethylene glycol, 1,3-propylene glycol, 1,2-propylene glycol, 1,4-butylene glycol, 1,5-pentane-diol, neopentyl glycol, 1,8-octane-diol, 1,9-nonane-diol, diethylene glycol, cyclohexane-1,4-diol, cyclohexane-1,4-dimethanol, dimer acid diols, trimethylenepropanol, glycerin, hexanetriol, N,N,N',N'-tetrakis(2-hydroxypropyl)ethyelenediamine, ethylene oxide adduct of bisphenol A, and propylene oxide adduct of bisphenol A.

When polyols having amide bonds in the molecules are used in the present invention, various diamines, triamines, and aminoalcohols are used for production of such polyols. Examples of such amines include hexamethylenediamine, xylenediamine, isophoronediamine, monoethanolamine, and triisopropanolamine. These amines may be used alone or in combination.

The acid value of the carboxyl-containing polyester resin is generally in the range of 20 to 90 gKOH/g, preferably 20 to 80 gKOH/g, and more preferably 25 to 60 gKOH/g.

The amount of the hardener to be blended with 100 parts by weight of epoxy resin is in the range of 2 to 20 parts by weight, preferably 3 to 15 parts by weight, and more preferably 4 to 10 parts by weight. A hardener content of less than 2 parts by weight requires a prolonged curing time and causes insufficient curing. A hardener content exceeding 20 parts by weight causes an undesirable thermal reaction in a production process of coating, resulting in poor coating film formability and a significantly decreased pot life of the coating.

When the carboxyl-containing polyester resin is used in the present invention, the molar ratio of the carboxyl groups of the polyester resin to the glycidyl groups of the epoxy resin is generally in the range of 0.4 to 3.0, preferably 0.5 to 2.0, and more preferably 0.6 to 1.6. A molar ratio of less than 0.6 causes an insufficient curing reaction, whereas a molar ratio exceeding 3.0 causes unsatisfactory curing of the coating film.

The content of the catalyst for curing the epoxy resin is generally in the range of 0.05 to 5.0 parts by weight and preferably 0.1 to 1.5 parts by weight with respect to 100 parts by weight in total of the epoxy resin and the hardener. Within such a catalyst content range, the resulting epoxy resin powder coating composition can be baked at lower temperatures and exhibits satisfactory pot life.

The epoxy resin composition and the powder coating composition of the present invention may contain various additives such as pigments in amounts within the scope of the present invention.

Examples of suitable pigments in the present invention include color pigments, such as titanium dioxide, iron oxide red, iron oxides, powdered zinc, carbon black, phthalocyanine blue, quinacridone pigments, azo pigments, isoindolinone pigments, and various calcined pigments; and extending pigments, such as silica, talc, barium sulfate, calcium carbonate, and glass flake.

Examples of other additives that may be compounded in the present invention include flame retardants, anti-sagging agents, thickening agents, surface controlling agents, ultraviolet absorbers, light stabilizers, antioxidants, and reinforcing agents.

When the epoxy resin composition of the present invention is used as a powder coating composition, the epoxy resin composition may contain any curable monomer, oligomer, and synthetic resin in order to improve the physical properties of the resulting coating film. Examples of synthetic resins include phenolic resins, alkyd resins, melamine resins, fluorinated resins, vinyl chloride resins, acrylic resins, silicone resins, and polyester resins. These synthetic resins may be used alone or in combination.

Using the epoxy resin composition of the present invention, a powder coating composition having a desired particle distribution may be produced as follows: An epoxy resin, a hardener, the curing catalyst of the present invention, and additives if necessary are compounded according to a predetermined formulation, melt-mixed with rollers, a kneader, or an extruder at a predetermined temperature and predetermined time that do not cause thickening and gelation, cooled, pulverized, and then classified. In general, the particle size of the powder coating composition is in the range of about 1 to 200 $\mu$m.

The powder coating composition may be coated with a flow improver by external addition to improve fluidity and prevent blocking.

The powder coating composition of the present invention can be used in any application without limitation, for example, corrosion protection and decoration of materials for civil engineering and construction, home electric appliances, heavy electric machines, materials for road construction, steel furniture, automobile parts, and materials for water supply, and powder coating for electrical insulation.

EXAMPLES

The present invention will now be described in further detail with reference to the following EXAMPLES. These EXAMPLES, however, do not limit the scope of the present invention.

Synthetic Example 1

Preparation of Tetraethylphosphonium Hydroxide

Using two cation-exchange membranes (Nafion 324: fluorinated resin type made by E. I. DuPont de Nemours) and an anion-exchange membrane (AMV: polystyrene type made by Asahi Glass Company) positioned between the cation-exchange membranes, an electrolytic bath is partitioned into an anode chamber, an intermediate chamber I (anode-side intermediate chamber), another intermediate chamber II (cathode-side intermediate chamber), and a cathode chamber.

The anode used was a platinum-coated titanium plate and the cathode was a SUS304 stainless steel plate. These chambers were thoroughly washed with water before use.

The anode chamber was filled with 4.28 kg of 2.93 weight percent oxalic acid aqueous solution, the intermediate chamber I with 12.5 kg of 2.51 weight percent hydrobromic acid, the intermediate chamber II with 11.6 kg of 7.61 weight percent tetraethylphosphonium bromide, and the cathode chamber with 11.6 kg of 2.0 weight percent tetraethylphosphonium hydroxide aqueous solution. A DC current of 18 to 22 volts was applied between the anode and the cathode at room temperature for 26 hours for electrolysis. In the cathode chamber, 12.04 kg of 8.68 weight percent tetraethylphosphonium hydroxide aqueous solution was yielded. In the electrolytic process, the electric charge applied was 8.33 F and the current efficiency was 59.4%.

The assay results of the tetraethylphosphonium hydroxide yielded in the cathode chamber are shown in Table 1.

TABLE 1

| Impurity | Content (ppm) |
| --- | --- |
| Chorine | <0.2 |
| Bromine | <0.2 |
| Other impurities | |
| Sodium | <0.05 |
| Potassium | <0.01 |
| Iron | <0.01 |
| Nickel | <0.02 |
| Chromium | <0.01 |
| Copper | <0.02 |
| Barium | <0.02 |
| Lead | <0.05 |
| Titanium | <0.01 |
| Sulfate | <0.2 |

Example 1

To 1,625.3 g (0.859 mole) of 8.68 weight percent tetraethylphosphonium hydroxide aqueous solution prepared as above, 180.45 g (0.863 mole) of 42% fluoroboric acid (made by Kanto Kagaku) was added. The resulting transparent and colorless solution was stirred at a room temperature of 28° C. for 1 hour. The solution was concentrated using a rotary evaporator under a reduced pressure to obtain 400.4 g of slurry. The slurry was cooled at 15° C. for about 2 hours, and was filtered to recover white crystals (192.35 g). The crystals were dried at 110° C. overnight to yield 168.29 g of tetraethylphosphonium tetrafluoroborate. The Br ion concentration determined by silver nitrate titration was 8 ppm Comparative Example 1

In COMPARATIVE EXAMPLE 1, 303.01 g (0.8 mole) of 60 weight percent tetraethylphosphonium bromide aqueous solution was heated to 50° C. Water (215 g) was added to sodium fluoroborate (92.23 g=0.84 mole). This solution was slowly added to the tetraethylphosphonium bromide aqueous solution over 10 minutes. After the mixture was stirred at 60° C. for 1 hour, 90 ml of water was added and the solution was gradually cooled to yield a white slurry. The slurry was condensed in a rotary evaporator under reduced pressure and was dried using an oil bath at 110° C. White crystals (276.20 g) were yielded.

In order to remove NaBr, the crystals were washed with 1430 g of acetone and dried. The yield of the resulting tetraethylphosphonium tetrafluoroborate was 193.53 g and the Br ion concentration determined by silver nitrate titration was 2.15%.

Comparative Example 2

Into a flask with a reflux condenser, 50.2 g of tetraethylphosphonium tetrafluoroborate obtained in COMPARATIVE EXAMPLE 1 and 250 g of methanol were placed, and the mixture was refluxed at 65° C. for 2 hours. The mixture was filtered and dried at 110° C. The yield of tetraethylphosphonium tetrafluoroborate was 21.45 g and the Br ion concentration determined by silver nitrate titration was 0.21%.

Comparative Example 3

As in EXAMPLE 1, 168.3 g of tetraethylphosphonium tetrafluoroborate containing 8 ppm of Br ions was prepared. Next, 100 g of tetraethylphosphonium tetrafluoroborate and 350 ml of deionized water were mixed at 25° C. to prepare slurry. NaBr (0.224 g) was added to the slurry. The mixture was cooled to 15° C. and filtered to recover white crystals (118.57 g). The crystals were dried overnight. The yield of the tetraethylphosphonium tetrafluoroborate was 103.10 g and the Br ion content determined by silver nitrate titration was 80 ppm.

<Preparation of Epoxy Powder Coating Compositions>

According to the recipe shown in Table 2, 32 parts by weight of an ester resin ER-8101 with an acid value of 63 mgKOH/g (acid-terminated polyester resin made by Nippon Ester Company Ltd.), Epicoat 1004 with an epoxy equivalent of 915 g/eq (bisphenol A-type epoxy resin made by Yuka Shell Epoxy Kabushiki Kaisha), an anti-sagging agent Modaflow Powder 2000 (acrylic oligomer made by Monsanto Industrial Chemicals Company), tetraethylphosphonium tetrafluoroborate (prepared in EXAMPLE 1 or COMPARATIVE EXAMPLE 1, 2, or 3), and titanium oxide were kneaded and the mixture was pulverized. Each powder was classified with a 150 mesh screen to prepare a powder coating composition with an average particle size of 40 μm.

TABLE 2

| | Powder Coating Composition | | | |
|---|---|---|---|---|
| | 1 | 2 | 3 | 4 |
| | Curing Catalyst Type | | | |
| | EXAMPLE 1 | COMPARATIVE EXAMPLE 1 | COMPARATIVE EXAMPLE 2 | COMPARATIVE EXAMPLE 3 |
| | Curing Catalyst Content | | | |
| | 2.0 | 2.0 | 2.0 | 2.0 |
| Ester Resin ER-8101 | 32 | 32 | 32 | 32 |
| Epicoat 1004 | 32 | 32 | 32 | 32 |
| Modaflow Powder 2000 | 1 | 1 | 1 | 1 |
| Titanium Oxide | 35 | 35 | 35 | 35 |

TABLE 3

| | Powder Coating Composition | | | |
|---|---|---|---|---|
| | 1 | 2 | 3 | 4 |
| Gelation Time (Sec) | 181 | 163 | 171 | 177 |
| Pot Life (Retention Rate (%)) | 96 | 67 | 72 | 81 |
| Coating Appearance | | | | |
| Baked at 160° C. | G | NSG | G | G |
| Baked at 140° C. | G | NSG | G | G |

<Evaluation of Powder Coating Composition>

The prepared powder coating compositions were evaluated as follows:

1. Gelation Time of Coating Measured at 170° C. by a stroke curing method.

2. Pot Life

The gelation time after the sample was allowed to stand in an oven at 40° C. for 10 days was measured, and the retention rate (%) was calculated according to the following equation:

Retention rate (%)=(initial gelation time)/(gelation time after 10 days at 40° C. )×100

3. Coating Appearance

Each powder coating composition was applied onto a cold rolled steel sheet at a thickness of 0.8 mm with an electrostatic coating gun and was baked at 160° C. for 140 minutes or 140° C. for 20 minutes. The coating appearance was observed visually and evaluated based on the following standards:

G: Good

NSG: Not so good

NG: Not Good

The results are shown in Table 3. The results in Table 3 show that the catalyst containing the reduced amount of halogen ions according to the present invention significantly improves the pot life of the powder coating composition.

Synthetic Example 2

Preparation of Triethylmethylphosphonium Hydroxide

Using the same apparatus used in SYNTHETIC EXAMPLE 1, the anode chamber was filled with 4.0 kg of 4.05 weight percent oxalic acid aqueous solution, the intermediate chamber I with 5.0 kg of 3.4 weight percent hydroiodic acid, the intermediate chamber II with 8.10 kg of 12.3 weight percent triethylmethylphosphonium iodide, and the cathode chamber with 4.00 kg of 0.45 weight percent triethylmethylphosphonium hydroxide aqueous solution. A DC current of 15 to 20 volts was applied for 24 hours for electrolysis. In the cathode chamber, 4.45 kg of 8.92 weight percent triethylmethylphosphonium hydroxide aqueous solution was yielded. In the electrolytic process, the electric charge applied was 3.25 F and the current efficiency was 77.6%.

The assay results of the triethylmethylphosphonium hydroxide yielded in the cathode chamber are shown in Table 4.

TABLE 4

| Impurity | Content (ppm) |
|---|---|
| Chorine | <0.2 |
| Bromine | <0.2 |
| Iodine | <0.2 |
| Other impurities | |
| Sodium | <0.05 |
| Potassium | <0.01 |
| Iron | <0.01 |
| Nickel | <0.02 |

TABLE 4-continued

| Impurity | Content (ppm) |
|---|---|
| Chromium | <0.01 |
| Copper | <0.02 |
| Barium | <0.02 |
| Lead | <0.05 |
| Titanium | <0.01 |
| Sulfate | <0.2 |

Example 2

To 1,581.5 g (0.859 mole) of 8.92 weight percent triethylmethylphosphonium hydroxide aqueous solution prepared as above, 180.45 g (0.863 mole) of 42% fluoroboric acid was added. The resulting transparent and colorless solution was stirred at a room temperature of 28° C. for 1 hour. The solution was concentrated using a rotary evaporator under a reduced pressure to obtain 406.2 g of slurry. The slurry was cooled at 15° C. for about 2 hours, and was filtered to recover white crystals (189.63 g). The crystals were dried at 110° C. overnight to yield 168.40 g of triethylmethylphosphonium tetrafluoroborate. The Br ion concentration determined by silver nitrate titration was 4 ppm.

<Preparation of Epoxy Powder Coating Compositions>

According to the recipe shown in Table 5, 32 parts by weight of an ester resin ER-8101 with an acid value of 63 mgKOH/g (acid-terminated polyester resin made by Nippon Ester Company Ltd.), Epicoat 1004 with an epoxy equivalent of 915 g/eq (bisphenol A-type epoxy resin made by Yuka Shell Epoxy Kabushiki Kaisha), an anti-sagging agent Modaflow Powder 2000 (acrylic oligomer made by Monsanto Industrial Chemicals Company), triethylmethylphosphonium tetrafluoroborate prepared in EXAMPLE 1, and titanium oxide were kneaded and the mixture was pulverized. In place of triethylmethylphosphonium tetrafluoroborate, triethylmethylphosphonium bromide was compounded for COMPARATIVE EXAMPLE 4, tetraphenylphosphonium tetrafluoroborate for COMPARATIVE EXAMPLE 5, and 2-undecylimidazole for COMPARATIVE EXAMPLE 6. Each powder was classified with a 150 mesh screen to prepare a powder coating composition with an average particle size of 40 μm.

<Evaluation of Powder Coating>

The gelation time, the pot life, and the coating appearance of each powder coating composition were evaluated as in Powder Coating Compositions 5 to 8. The results are shown in Table 6.

TABLE 5

| | Powder Coating Composition | | | |
|---|---|---|---|---|
| | 1 | 2 | 3 | 4 |
| | Curing Catalyst Type | | | |
| | EXAMPLE 1 | COMPARATIVE EXAMPLE 5 | COMPARATIVE EXAMPLE 6 | COMPARATIVE EXAMPLE 7 |
| | Curing Catalyst Content | | | |
| | 2.0 | 2.0 | 2.0 | 2.0 |
| Ester Resin ER-8101 | 32 | 32 | 32 | 32 |
| Epicoat 1004 | 32 | 32 | 32 | 32 |
| Modaflow Powder 2000 | 1 | 1 | 1 | 1 |
| Titanium Oxide | 35 | 35 | 35 | 35 |

TABLE 6

| | Powder Coating Composition | | | |
|---|---|---|---|---|
| | 5 | 6 | 7 | 8 |
| Gelation Time (Sec) | 181 | 179 | 185 | 175 |
| Pot Life (Retention Rate (%)) | 93 | 72 | 77 | 75 |
| Coating Appearance | | | | |
| Baked at 160° C. | G | G | G | G |
| Baked at 140° C. | G | G | G | G |

What is claimed is:

1. A catalyst for curing epoxy resins comprising a tetraalkylphosphonium tetrafluoroborate represented by Formula (1):

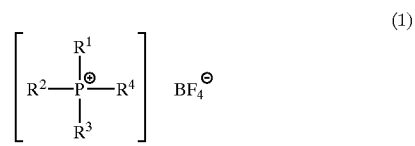

(1)

wherein $R^1$, $R^2$, $R^3$, and $R^4$ are each C1–C5 linear or branched alkyl and may be the same or different, and the halogen ion content in the tetraalkylphosphonium tetrafluoroborate is 20 ppm or less.

2. A method for making the catalyst according to claim 1 comprising allowing a tetraalkylphosphonium hydroxide represented by Formula (2) to react with fluoroboric acid:

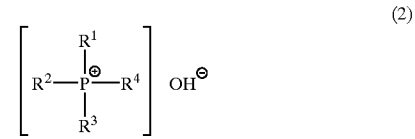

(2)

3. The method according to claim 2, wherein the tetraalkylphosphonium hydroxide has a halogen ion content of 10 ppm or less and is used as an aqueous solution with a tetraalkylphosphonium hydroxide content in the range of 2 to 50 percent by weight.

4. An epoxy resin composition comprising an epoxy resin, a hardener, and the catalyst according to claim 1.

5. The epoxy resin composition according to claim 4, wherein the hardener is a carboxyl-containing polyester resin.

6. A powder coating composition comprising the epoxy resin composition according to either claim 4 or 5.

* * * * *